(12) United States Patent
Wei et al.

(10) Patent No.: US 9,582,380 B2
(45) Date of Patent: *Feb. 28, 2017

(54) SECURE FALLBACK NETWORK DEVICE

(71) Applicant: Cisco Technology, Inc., San Jose, CA (US)

(72) Inventors: James Wei, Fremont, CA (US); Yosef Rizal Tamsil, Hillsborough, CA (US); Suresh Ganjigunta Padmanabhan, San Jose, CA (US); Subbiah Kandasamy, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/703,349

(22) Filed: May 4, 2015

(65) Prior Publication Data

US 2015/0234722 A1 Aug. 20, 2015
US 2016/0299822 A9 Oct. 13, 2016

Related U.S. Application Data

(63) Continuation of application No. 12/981,385, filed on Dec. 29, 2010, now Pat. No. 9,027,095, which is a
(Continued)

(51) Int. Cl.
*G06F 11/20* (2006.01)
*H04L 29/06* (2006.01)

(52) U.S. Cl.
CPC ...... *G06F 11/2033* (2013.01); *H04L 63/0823* (2013.01); *G06F 2201/805* (2013.01)

(58) Field of Classification Search
CPC .......... G06F 11/2033; G06F 2201/805; H04L 63/0823
(Continued)

(56) References Cited

U.S. PATENT DOCUMENTS 4,903,260 A 2/1990 Boettle et al.
5,347,516 A 9/1994 Yoshida
(Continued)

FOREIGN PATENT DOCUMENTS

| CA | 2265776 | 4/1998 | ............. H04L 12/56 |
| EP | 0 732 835 | 9/1996 | ............. H04L 29/06 |

(Continued)

OTHER PUBLICATIONS

USPTO; Office Action dated Aug. 9, 2010 for U.S. Appl. No. 11/929,001, filed Oct. 30, 2007 in the name of Walter G. Dixon, 16 pages.
(Continued)

*Primary Examiner* — Amare F Tabor
*Assistant Examiner* — Aubrey Wyszynski
(74) *Attorney, Agent, or Firm* — Baker Botts L.L.P.

(57) ABSTRACT

A network device and method may provide secure fallback operations. The device includes a port allowing the device to communicate with a network and a processor to generate a security credential, provide the security credential to a call manager during initialization, and provide the security credential to a secondary device during fallback operations. The network device may include a memory to store the security credential and routing information for fallback operations.

15 Claims, 3 Drawing Sheets

Related U.S. Application Data continuation of application No. 10/940,105, filed on Sep. 13, 2004, now Pat. No. 7,886,344.

(58) Field of Classification Search
USPC .......................................................... 726/6
See application file for complete search history.

(56) References Cited

U.S. PATENT DOCUMENTS

| | | | |
|---|---|---|---|
| 6,161,145 | A | 12/2000 | Bainbridge et al. |
| 6,377,570 | B1 | 4/2002 | Vaziri et al. |
| 6,625,256 | B1 | 9/2003 | Tasker et al. |
| 6,671,272 | B2 | 12/2003 | Vaziri et al. |
| 6,738,784 | B1 | 5/2004 | Howes |
| 6,885,857 | B1 | 4/2005 | Hanson |
| 6,931,526 | B1 * | 8/2005 | Bacha ............... G06Q 20/02 705/76 |
| 7,072,354 | B1 | 7/2006 | Beathard |
| 7,457,287 | B1 * | 11/2008 | Shaffer ............ H04L 12/5695 370/389 |
| 2002/0116464 | A1 | 8/2002 | Mak |
| 2003/0065920 | A1 * | 4/2003 | Benantar ........... H04L 63/0823 713/175 |
| 2004/0037219 | A1 * | 2/2004 | Shaffer ............ H04L 29/06027 370/217 |
| 2005/0276406 | A1 * | 12/2005 | Keohane ............... H04M 3/56 379/202.01 |

FOREIGN PATENT DOCUMENTS

| | | | |
|---|---|---|---|
| EP | 1014632 | 6/2000 | ............ H04L 12/64 |
| GB | 2 283 154 | 4/1995 | ............ H04Q 11/04 |
| WO | 90/12466 | 10/1990 | ............ H04L 12/64 |
| WO | 95/25407 | 9/1995 | ............ H04Q 7/22 |
| WO | 95/31060 | 11/1995 | ............ H04L 12/66 |
| WO | 97/18665 | 5/1997 | ............ H04N 1/00 |

OTHER PUBLICATIONS

Walter G. Dixon, et al.; *System and Method for Billing End Users in a Peer-to-Peer Transaction in a Network Environment*; U.S. Appl. No. 11/929,001, filed Oct. 30, 2007.

ITU Telecommunciation Standardization Sector (ITU-T), "Draft Recommendation H.323: Visual Telephone Systems and Equipment for Local Area Networks which Provide a Non-Guaranteed Quality of Service," SG15 Plenary May 28, 1966, pp. 1-75.

Nakamura, Y., "On a Hybrid Network System of Circuit Switcing and Packet Switching," The Transactions of the IECE of Japan, vol. E 65, No. 6, Abstracts, Jun. 6, 1982.

Low, C., et al., "Webin—An architecture for Fast Deployment of IN-based Personal Services," Workshop Record, Intelligent Network, Freedom and Flexibility: Realising the Promise of Intelligent Network Services, Apr. 21, 1996, p. 1-12, XP002043670.

Babbage, R., et al., "Internet phone—Changing the Telephony Paradigm?," BT Technical Journal, vol. 15, No. 2, Apr. 1997, p. 145-157, XP000676853.

* cited by examiner

SECURE FALLBACK NETWORK DEVICE

CROSS REFERENCE TO RELATED APPLICATIONS DATA

This application is a continuation under 35 U.S.C. §120, of U.S. patent application Ser. No. 12/981,385, filed Dec. 29, 2010, and entitled "Secure Fallback Network Device," which is a continuation of copending U.S. application Ser. No. 10/940,105, filed Sep. 13, 2004, and entitled "Secure Fallback Network Device," now U.S. Pat. No. 7,886,344, issued Feb. 8, 2011 herein incorporated by reference.

BACKGROUND

It is becoming more common for enterprises to employ a wide area network (WAN) to connect several smaller or branch offices to the main office. This is true for both data networks and voice networks. The smaller offices may rely upon the WAN connection to the main office for many types of services, including call management, routing and directory services. Typically, the call management, routing and directory service may be controlled by a central entity, referred to here as a call manager.

There may be several call managers coordinating different regions of the WAN, based upon enterprise function, geography, size, etc. In addition, the call manager functions may be distributed across several different network devices. No limitation upon implementation or configuration of a call management function is implied or intended by the use of the term 'call manager.'

Issues may arise at the branch offices if the WAN becomes inoperative or loses communication. With the loss of the call manager, the branch office may not be able to make phone calls, in addition to losing their connections to the data networks. This is unacceptable for stable operations.

A solution to these issues may be referred to as 'fallback' operations. In fallback operations, a fallback device or devices have been designated to assume the functions of call manager during WAN failure. Secondary devices may contact the fallback device during fallback operations, and the fallback device will need to verify its identity. The secondary device may be a secondary call manager that is assuming operations from the primary call manager, or a network phone desiring fallback services. The phones or data network devices that will rely upon this fallback device are configured with this information by the call manager during normal WAN operation.

However, fallback operations have not previously encompassed secure operations, in which secure phones are listed in a list of trusted devices, on a scale broad enough to provide secure operations for larger operations.

BRIEF DESCRIPTION OF THE DRAWINGS

Embodiments of the invention may be better understood when reviewed in conjunction with the following drawings, in which.

DETAILED DESCRIPTION OF THE EMBODIMENTS

Figure 1:
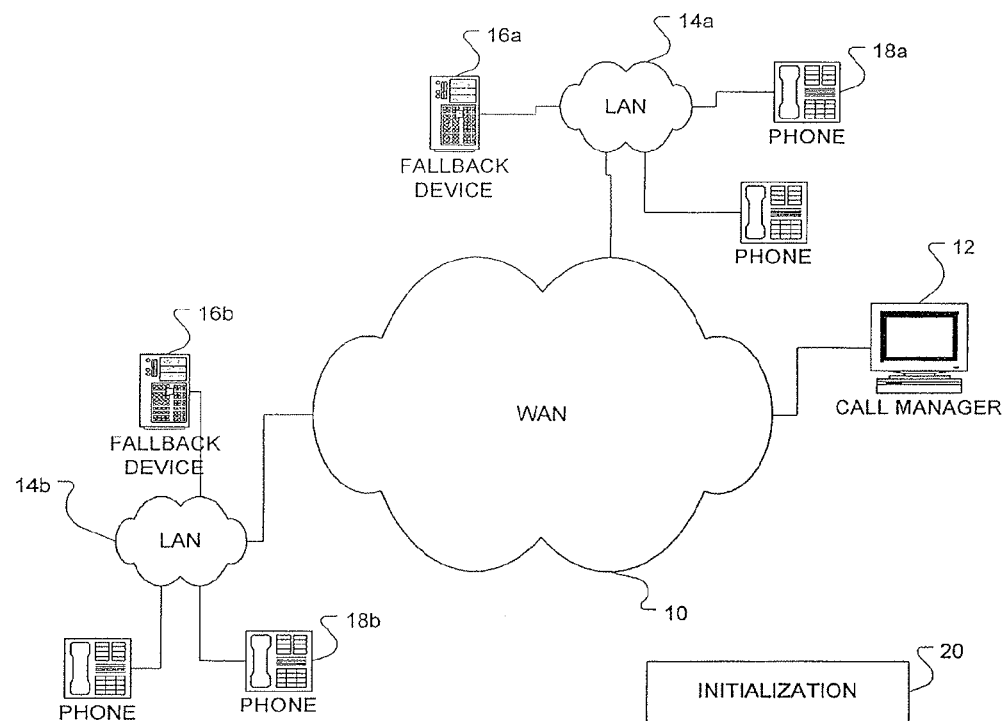
FIG. 1 shows an example of a WAN having several smaller branch offices or LANs.

FIG. 1 shows an example of a wide-area network (WAN) having several smaller, local-area networks (LANs). The WAN 10 provides the network devices, such as servers and routers, access to the call manager 12. As mentioned before, the entity performing the functions of the call manager may not be designated as such, and may even be merely a process or service running on an existing device central to the WAN. The call manager provides routing information, directory services and other network-related services to the network devices for the WAN.

The LANs 14*a* and 14*b* may represent smaller, branch offices of the overall enterprise, or may be other types of organizations within the enterprise. The phone 18*a* is a network phone, which may be device that appears similar to a traditional telephone, but uses a data network connection for voice data, or it may be a computer or workstation having a microphone, a sound card and a voice encoder, as examples. The phone allows users to place voice calls over the data network.

Voice over data network calls generally involve a user speaking into a handset or microphone that captures the audio signals digitally and then packetizes the signals and transmits them over a data network. This is far different than a public switched transmission network telephone call, but allows users to place calls using existing infrastructure of the enterprise and use available bandwidth on the data network, saving money.

As discussed above, a problem occurs when the connection between the LANs and the WAN fails, or the call manager goes off line. The network devices in the LAN that rely upon the call manager for operations no longer have the ability to function without the call manager. This is generally the scenario in which fallback operations commence. In fallback operations, a fallback device, such as a local network device picks up some of the functionality of the call manager to allow the local offices to remain functional. The fallback device has been configured with the necessary information to allow it to provide fallback operations.

For example, if either the call manager 12 failed, or the WAN 10 went down, the phone 18*a* would be disabled unless the fallback device 16*a* could provide fallback operations temporarily. This device, whether it is a fallback router, server or other device, will be referred to as the fallback device. The fallback device, up to this point, has not been able to handle large volumes of secure calls.

A secure call is one made between two endpoints that are both on a 'trusted' list, where both of them have been identified as secure devices. In some instances, the trusted list does not list all of the secure devices and in the volume of transactions that may occur, more secure devices than are on the list may be needed.

Figure 2:
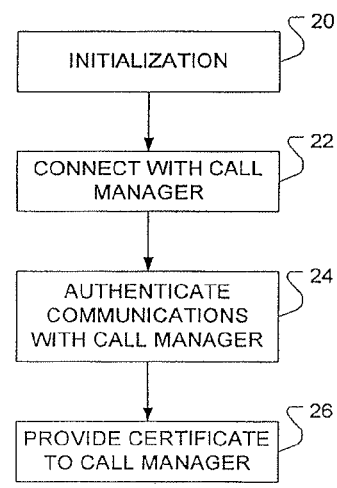
FIG. 2 shows an embodiment of a method of providing an authentication of a secure fallback device during initialization.

It is possible to configure network devices for fallback operations to include security elements, allowing secure calls to be made during fallback operations. A flowchart of an embodiment of a method for providing a security credential from a candidate secondary device is shown in FIG. 2. The network device that is capable of providing secure fallback operations is initialized at 20. Initialization may be at launching of a network, or addition of a new device to an existing network. The newly-initialized device connects with the call manager at 22 and authenticates communications at 24. These two processes may occur simultaneously or separately, depending upon the security protocol used for authenticating communications. An example is a security handshake with server authentication, such as under the Transport Layer Security (TLS) protocol promulgated by the Internet Engineering Task Force (IETF).

During the authentication process, or immediately after general authentication, the network device provides a security credential or certificate to the call manager at 26. The security credential could be one of many different types of credentials or certificates, including a digital signature, platform token, etc.

Figure 3:
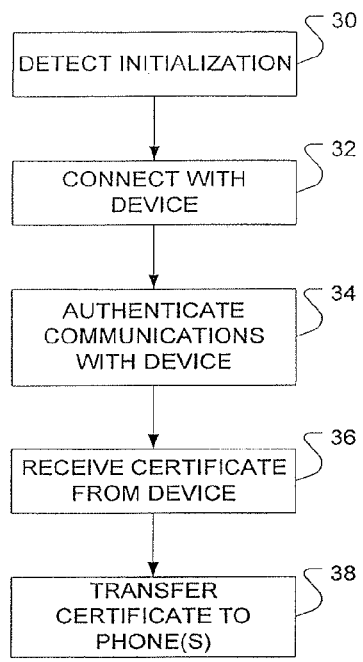
FIG. 3 shows an embodiment of a method of receiving an authentication of a secure fallback device during initialization.

Referring now to FIG. 3, it can be seen that the call manager has processes that mirror those of the network device. The call manager detects initialization at 30, which may involve the network device contacting the call manager with a request for directory services, or another device in the network informing the call manager that there is a new network device. The call manager performs its portions of connecting and authenticating communications with the network device at 32 and 34. Once the call manager has received the certificate from the network device at 36, it now provides it to the relevant secondary device, where the secondary device may be a network phone or a secondary call manager, or any device that will contact the fallback device during fallback operations.

This process has assumed that the phones already exist in the network and that the network device is new. However, the process would be generally the same for new phones being configured with the certificate of an existing fallback device, the process of retrieving the certificate from the fallback device by the call manager would just occur at network start up. When new phones are added to the network that will use the network device for fallback operations, the call manager configures them with the certificate. Similarly, any secondary call managers that are added to the network and designated as the secondary call manager for the fallback operations will be updated with the certificates of fallback devices.

Figure 4:
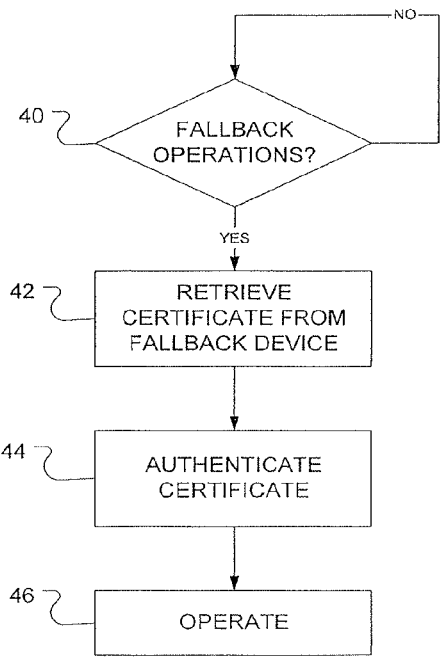
FIG. 4 shows an embodiment of a method of authenticating a fallback device.

The secondary devices will store the certificate locally, so that upon failure of the WAN or the call manager, the secondary devices will have a way to ensure that the network device is secure. An embodiment of such a method for verifying a fallback device is shown in FIG. 4. At 40, the secondary detects the commencement of fallback operations. This may be the secondary device making this determination or the secondary device being notified of this by the fallback device, as examples. At 42, the secondary device retrieves the certificate from the fallback device. This may involve the secondary device actively retrieving it from the device, such as connecting to a particular port, or being provided the certificate from the fallback device.

At 44, the secondary device authenticates the certificate. Generally, this will involve the secondary device accessing the previously stored certificate and comparing it with the newly-provided certificate. The previously stored certificate may be in the configuration file of the phone, for example, or in the database of the secondary call manager. If the two certificates match, the secondary device can verify that the device presenting itself as the fallback device is indeed the fallback device designated for secure calls and may begin secure operations at 46.

Figure 5:
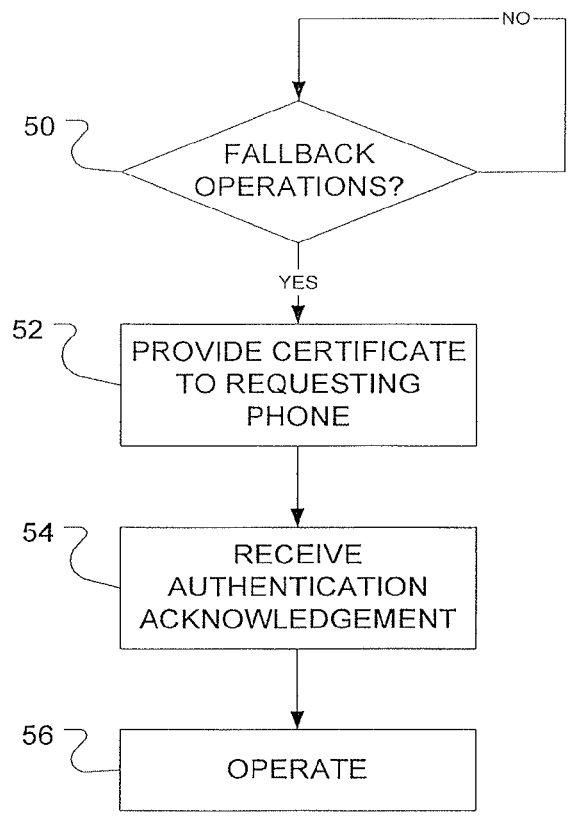
FIG. 5 shows an embodiment of a method of providing authentication to a secondary device.

The fallback device, for its part, will provide the certificate to the phones that have the fallback device designated for their secure operations, and any secondary call managers, to verify its identity. An embodiment of this is shown in FIG. 5. At 50, the fallback device detects commencement of fallback operations. As the fallback device is generally a router or other network device that interacts with the WAN, this would seem to be easily detectable. The fallback device may detect the commencement of fallback operations because it has received a secure routing or other traffic request from one of the phones assigned to it for fallback operations. Alternatively, if the onset of fallback communications is due to failure of the primary call manager, the fallback device may detect the onset of fallback operations when it is notified of such by the secondary call manager.

At 52, the fallback device provides its certificate to the secondary devices that request it. These secondary devices are generally identified to the fallback device, and the fallback device is generally designated as such for selected secondary devices, during normal network operations. The fallback device may provide its certificate as part of the initial contact between the secondary device and the fallback device.

The secondary device verifies the certificate and then acknowledges the authenticity at 54. There may be no explicit acknowledgement, but merely the start of secure routing or other traffic requests from the phone. In either case, the fallback device provides secure fallback operations at 56.

As mentioned previously, the fallback device may be a local device, such as fallback device 16a of FIG. 1. During normal network operations, the fallback device performs its functions as a normal network device, such as routing, providing services, etc. Upon the commencement of fallback operations, the network device would begin to provide some limited call manager-like services during fallback operations.

Figure 6:
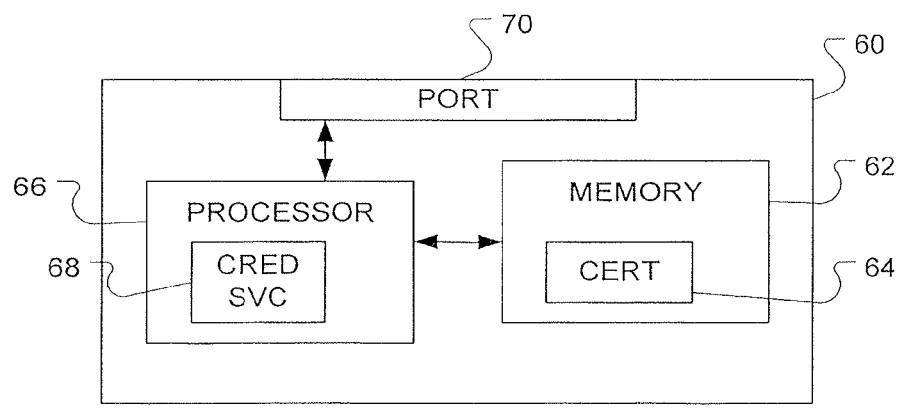
FIG. 6 shows an embodiment of a secure fallback network device.

An example of such a network device is shown in FIG. 6. The network device 60 typically will have at least one port 70 to allow the device to communicate with the network. It may have more than one port, for example, if it is a routing device, there may be multiple ports allowing multiple devices to connect to it. There may also be a port designated for WAN operations and a port for LAN operations.

The network device will also generally have a processor 66 that will provide the credentialing service. The credentialing service 68 may generate a security credential, which may be the generation of the security credential upon configuration, or it may be retrieving a security credential provided in the device at manufacture. The processor may also handle communications with the call manager and ensure that the call manager is provided the security credential to a call manager during initialization.

In addition, the processor will also provide the security credential to the secondary device during fallback operations, where the secondary device is a network phone, or a secondary call manger as discussed above.

The network device may also comprise a memory 62 in which is stored the certificate. It must be noted that the certificate as stored or provided may be any type of security token, or representations of tokens. For example, it may be a platform token, a hash or shortened version of a platform token, a shared credential, a certificate, etc.

The fallback device may be an existing network device that has instructions executed by a processor. The fallback device may be implemented by instructions contained on an article of machine-readable media that, when executed, cause the machine to perform the methods of the invention. In this instance, the machine would be the fallback device, and the machine-readable instructions may be firmware or other software updates to the existing processor.

Thus, although there has been described to this point a particular embodiment for a method and apparatus to provide secure fallback operations, it is not intended that such specific references be considered as limitations upon the scope of this invention except in-so-far as set forth in the following claims.

The invention claimed is:

1. A fallback network device, comprising:
   a port allowing the fallback device to communicate with a network; and
   a processor to:
      generate a security credential certificate;
      authenticate with a call manager under a security protocol by providing the security credential certificate to the call manager; and
      provide secure fallback operations when the call manager is unavailable,
      wherein the fallback device is able to detect the commencement of the fallback operations.

2. The fallback device of claim 1, the fallback device further comprising a memory to store the security credential certificate and routing information for the secure fallback operations.

3. The fallback device of claim 1, the processor operable to generate a security credential certificate further comprising a processor to generate one selected from the group comprised of: a platform token and a shared credential.

4. The fallback device of claim 1, the fallback device further comprising a second port, wherein the port allowing communications with a network is a wide-area network port and the second port is a local area network port.

5. The fallback device of claim 1, wherein the fallback device is configured to detect commencement of the fallback operations by receiving a notification from the secondary call manager.

6. The fallback device of claim 1, wherein the fallback device is configured to provide the security credential certificate to the secondary call manager responsive to an initial contact between the fallback device and the secondary call manager.

7. The fallback device of claim 1, wherein the fallback device is configured to provide routing and network services during normal network operations.

8. The fallback device of claim 7, wherein the fallback device is configured to provide call manager-like services during the fallback operations.

9. A method of providing secure fallback operations, the method comprising:
   authenticating a call manager under a security protocol by receiving a security credential certificate from a fallback network device phone;
   assigning a network phone to the fallback device for fallback operations;
   providing the security credential certificate to the network; and
   storing the security credential certificate locally on the network phone.

10. The method of claim 9, further comprising performing secure fallback operations using the fallback device when the call manager is unavailable.

11. The method of claim 9, further comprising detecting commencement of fallback operations by receiving a traffic request from the network phone.

12. The method of claim 9, wherein the security credential certificate comprises a previously stored certificate on the network phone, the method further comprising:
   retrieving a second security credential certificate from the fallback device;
   comparing the second security credential certificate with the previously stored certificate; and
   when the second security credential certificate matches the previously stored certificate, beginning secure fallback operations using the fallback device.

13. The method of claim 12, further comprising providing the second security credential certificate to the network phone during the fallback operations for comparison with the previously stored security credential certificate.

14. The method of claim 9, further comprising detecting commencement of fallback operations by detecting loss of connection with a wide-area network.

15. The method of claim 9, further comprising detecting commencement of fallback operations by receiving a message from the fallback device.

* * * * *